United States Patent [19]

Boylan et al.

[11] Patent Number: 5,490,055
[45] Date of Patent: Feb. 6, 1996

[54] MULTILOOP FEEDBACK CONTROL APPARATUS FOR DC/DC CONVERTERS WITH FREQUENCY-SHAPING BAND PASS CURRENT CONTROL

[75] Inventors: Jeffrey J. Boylan, Dallas; Allen F. Rozman, Richardson, both of Tex.

[73] Assignee: AT&T Corp., Coral Gables, Fla.

[21] Appl. No.: 25,539

[22] Filed: Mar. 3, 1993

[51] Int. Cl.$^6$ .............................. H02M 1/12; G05F 1/40
[52] U.S. Cl. ................................... 363/41; 323/285
[58] Field of Search .................. 363/16, 18, 19, 363/20, 21, 41, 74, 78, 79, 80, 95, 97, 127, 131; 323/234, 242, 282, 285, 287, 288

[56] References Cited

U.S. PATENT DOCUMENTS

| | | | |
|---|---|---|---|
| 4,333,133 | 6/1982 | Pernyeszi | 363/15 |
| 4,816,982 | 3/1989 | Severinsky | 363/44 |
| 4,866,367 | 9/1989 | Ridley | 323/287 |
| 4,894,520 | 1/1990 | Moran | 219/497 |
| 4,969,079 | 11/1990 | Kiriyama et al. | 363/41 |
| 5,099,406 | 3/1993 | Harada | 363/20 |
| 5,126,931 | 6/1993 | Jitaru | 363/21 |
| 5,177,676 | 7/1993 | Inam et al. | 363/80 |
| 5,180,964 | 8/1993 | Ewing | 323/285 |
| 5,264,782 | 11/1993 | Newton | 323/288 |
| 5,267,138 | 11/1993 | Shores | 363/95 |

FOREIGN PATENT DOCUMENTS

| | | | |
|---|---|---|---|
| 0508664 | 10/1992 | European Pat. Off. | H02M 3/337 |
| 4128962A1 | 8/1991 | Germany . | |

OTHER PUBLICATIONS

"Closed–Loop Performance Comparisons of Switching Regulators with Current–Injected Control", G. K. Schoneman, D. M. Mitchell, *IEEE Transactions on Power Electronics*, vol. 3, pp. 31–43, Jan. 1988.

"Simple Switching Control Changes Power Converter into a Current Source", C. W. Deish, *IEEE PESC Proceedings*, 1978, pp. 324–335.

"A New Continuous–Time Model for Current–Mode Control with Constant Frequency, Continuous On–Time, and Constant Off–Time, in CCM and DDM", R. B. Ridley, *IEEE PESC Proceedings*, pp. 382–389, 1990.

"Simple Switching Control Method Changes Power Converter Into a Current Source" C. W. Deisch, *IEEE PESC Proceedings*, pp. 300–306, 1978.

"Topics in Multiple–Loop Regulators and Current–Mode Programming", R. D. Middlebrook, *IEEE PESC Proceedings*, pp. 716–732, 1985.

"Comparison of Performance of Single–Loop and Current–Injection–Control for PWM Converters Which Operate in Both Continuous and Discontinuous Modes of Operation", D. M. Sable, R. B. Ridley, B. H. Cho, *IEEE PESC Proceedings*, pp. 74≧79, 1990.

"Analysis and Interpretation of Loop Gains of Multiloop–Controlled Switching Regulators", R. B. Ridley, B. H. Cho, F. C. Lee, *IEEE Transactions on Power Electronics*, pp. 489–498, 1988.

(List continued on next page.)

*Primary Examiner*—Matthew V. Nguyen
*Attorney, Agent, or Firm*—Alfred G. Steinmetz

[57] ABSTRACT

A switched mode power converter includes a periodically switched power switch which is switched under the control of a multiple loop feedback controlling the power switch in order to supply a regulated output. The output voltage and power switch current are sensed. An error voltage is generated which is representative of the deviation of the output voltage from a regulated value. A voltage derived from the power switch current is limited in its low frequency response and is then combined with the error voltage. The low frequency response of the current loop gain is used to maintain an advantageously low output impedance for the power supply. This shaped loop gain response advantageously allows accurate adjustment of the current loop gain and reduces the system to a lower order while maintaining adequate loop stability. The low frequency response may be attained by limiting the low frequency response of the sensed current or by inserting an operational amplifier in the feedback path to limit its low frequency response.

15 Claims, 3 Drawing Sheets

OTHER PUBLICATIONS

"Near-Optimum Dynamic Regulation of DC-DC Converters Using Feed Forward of Output Current and Input Voltage with Current-Mode Control", R. Redl, No. O. Sokal, *IEEE Transactions on Power Electronics,* pp. 181–192, vol. PE–1, No. 3, 1986.

"Small Signal Modeling of Average Current–Mode Control", R. B. Ridley, E. C. Lee, W. Tang, *IEEE APEC Proceedings,* 1992, pp. 747–755.

"Constant Frquency Forward Converter with Resonant Transitions", I. Jitaru HFPC '91 Proceedings, pp. 282–292.

MULTILOOP FEEDBACK CONTROL APPARATUS FOR DC/DC CONVERTERS WITH FREQUENCY-SHAPING BAND PASS CURRENT CONTROL

FIELD OF THE INVENTION

This invention relates to a multiloop feedback control for a switching mode power converter and in particular to the shaping of the frequency response of a current feedback loop to lower the output impedance of the converter.

BACKGROUND OF THE INVENTION

Multiloop feedback arrangements, including both current and voltage control, are used in switching mode power converters to improve many of its operating characteristics over those of similar power converters with single loop feedback control. Not all the changes in characteristics are improvements however. The closed loop output impedance of a switching mode power converter with a multiloop feedback control is normally greater than that of a converter with single loop feedback control. This increase in output impedance is due mainly to the presence of the current mode feedback loop. At low frequencies, below the resonant frequency of the output filter of the power converter the current loop adds further output impedance and in addition is not effective in significantly enhancing the closed loop performance of the converter. The low frequency output impedance of the converter is significantly increased below the output filter resonant frequency. In addition, at frequencies approaching one half the switching frequency, excessive current loop gain may introduce instablility into the feedback loop. Since a voltage source (i.e. the voltage regulated switching mode power converter) should have a relatively low output impedance, it is desirable to reduce the high output impedance introduced by the current feedback loop.

SUMMARY OF THE INVENTION

Therefore a current feedback loop in a multiloop feedback arrangement has its frequency response shaped at low frequencies so that its loop gain is negligible below the output filter resonant frequency in order to reduce the output impedance of the power converter. Current loop gain is controlled within a pass band about a resonant frequency of the power converter output filter and at half the switching frequency to prevent instability in the feedback loop. These gain controls are operative to reduce the output impedance at low frequencies and reduce the order of the feedback control, while maintaining system stability.

A switched mode power converter, embodying the principles of the invention, includes a periodically switched power switch which is switched under the control of a multiple loop feedback in order to supply a regulated output. The output voltage and power switch current is sensed. An error voltage is generated which is representative of the deviation of the output voltage from a regulated value. A voltage derived from the power switch current is then added to the error voltage. The amplifier adding the error voltage to the voltage derived from the power switch current is attenuated in its low frequency response, below the resonant frequency of the output filter of the power supply, in order to shape the frequency response of the current loop gain to maintain an advantageously low output impedance for the power supply. This shaped loop gain response advantageously allows accurate adjustment of the current loop gain and reduces the feedback system to a lower order (i.e. fewer poles).

In another version the voltage derived from the converters current is directly limited in its low frequency response and combined with a periodic ramp voltage to control the switching interval of the power switch.

In all illustrative embodiments accurate shaping of the frequency response of the current loop of a multiloop feedback circuit is achieved by means of a high pass current control. A particular high pass characteristic is achieved by shaping the response with a zero at DC to attenuate the current loop gain at low frequencies. A pole is positioned in frequency at or below the resonant frequency in order to provide a flat response to the midrange of the loop gain and a second pole is added to reduce loop gain at or close to the power switching frequency.

This multiloop feedback arrangement is generally applicable to buck, boost, and buck-boost derived converters as well as many other converter topologies such as Cuk converters, etc.

DETAILED DESCRIPTION

Figure 1:
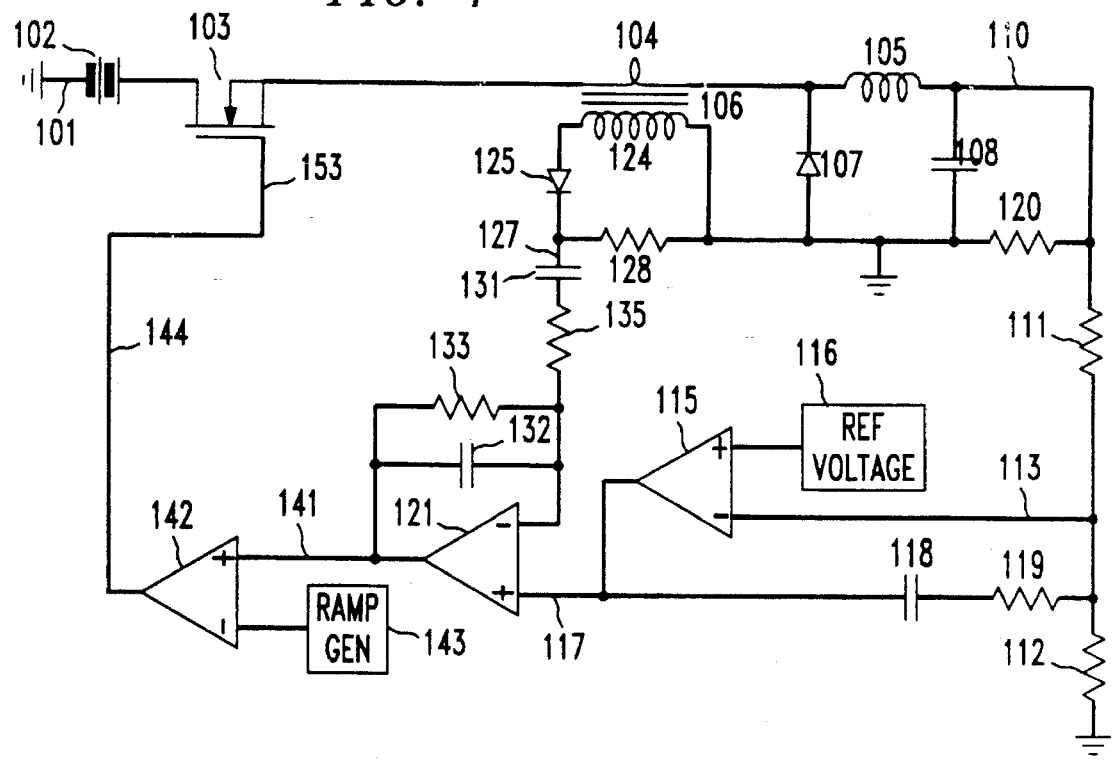
FIG. 1 is a schematic of a switching mode power converter employing feedback control in accord with the principles of the invention.

A switching mode power converter of the buck type, shown in FIG. 1, has an input lead 101 connected to receive the voltage of the DC voltage source 102. An FET power switch 103 connects the input to an output filter inductor 105 through a current sensing winding 104 of the current sensing transformer 106. A flyback diode 107 is connected to the inductor 105 in order to provide current to the inductor during non conducting intervals of the power switch 103. A filter capacitor 108 is connected to the output lead 110. Inductor 105, and capacitor 108 comprise a low pass filter which has a characteristic resonant frequency. A load resistor 120 to be energized is connected to the output lead 110.

A voltage divider including resistors 111 and 112 is connected to the output lead 110. A voltage proportional to the output voltage is sensed on lead 113 and applied to an inverting input of the error amplifier 115. Error amplifier 115 includes a feedback capacitor 118 and is operative as an integrating amplifier. A reference voltage 116 is applied to the non-inverting input of the amplifier 115. The error voltage output of the amplifier 115, on lead 117, is representative of an integral of the voltage difference between the inverting and non-inverting inputs. An integrating capacitor 118 and resistor 119 connects the inverting input to the output lead 117 and sums an integral value with the input differential.

The error voltage on lead 117 is applied to the non-inverting input of the amplifier 121. Amplifier 121 has its inverting input connected to accept a voltage representative of the current sensed by the winding 104. Winding 104 is magnetically coupled by the core of the transformer 106 to its secondary winding 124. The voltage of winding 124 is rectified by diode 125 and developed across the resistor 128. The voltage developed across resistor 128 is connected, via lead 127 to the capacitor 131. Capacitor 131 is in turn connected, via the resistor 135, to the inverting input of amplifier 121.

Capacitor 131 differentiates the voltage supplied by resistor 128 and with amplifier 121 forms the classic differentiator amplifier configuration. A parallel connected capacitor 132 and resistor 133 in the amplifier's feedback loop clamps the amplifier's mid frequency response. The addition of the resistor 135 and capacitor 132 add the necessary pole values to achieve the desired frequency response of the current feedback loop.

The output of amplifier 121 on lead 141 is connected to the non-inverting input of the pulse width modulating (PWM) amplifier 142. The output of a periodic ramp generator 143 is connected to its inverting input. The output of the PWM amplifier 142 is coupled, via lead 144, to the gate electrode 153 of the FET power switch 103.

Figure 2:
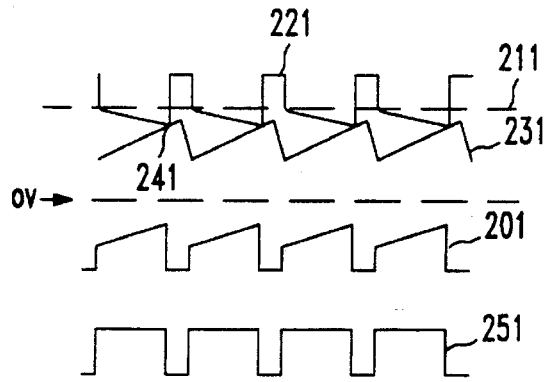
FIG. 2 discloses voltage waveforms to assist in describing the operation of the circuit of FIG. 1.

In operation the periodic conduction of the power switch 103 enables discontinuous current flow (as shown by the voltage waveform 201 in FIG. 2) from the voltage source 102 to the filter inductor 105. The low pass output filter comprising the filter inductor 105 and filter capacitor 108 converts the current pulses to a substantially DC voltage which is applied to the load resistor 120. This output voltage is sensed by the voltage divider comprising the resistors 111 and 112 and a voltage proportionate to the output voltage is taken from its midpoint node and applied via lead 113 to the inverting input of the operational amplifier 115 which is connected into an integrating configuration with the feedback capacitor 118. The integration amplifier 115 responds to the proportionate voltage on lead 113 and a reference voltage applied to its non-inverting input to generate an error voltage (voltage level 211 in FIG. 2) on its output lead 117. This error voltage is proportional to the error between the output voltage on output lead 110 and a voltage defined by the reference voltage source 116. This error voltage is applied to the non-inverting input of the amplifier 121.

A voltage signal proportional to the current of the power switch is rectified by diode 125 and the voltage 201 (see FIG. 2) is applied to the input capacitor 131 connected to the inverting input of amplifier 121. The input capacitor 131 and input resistor 135 in combination with the feedback capacitor 132 and its parallel connected feedback resistor 133 are selected to cause the amplifier 121 to operate in a band or high pass mode of operation essentially rejecting low frequency signals below the resonant frequency of the output filter.

The output of the amplifier 121 (voltage waveform 221 in FIG. 2) is a scaled inverted version of the voltage waveform 201 offset by the error voltage (voltage waveform 211 in FIG. 2) and is connected to the non-inverting input of amplifier 142. The ramp signal (voltage waveform 231 in FIG. 2) connected to the inverting input in combination with the level of the output of amplifier 121 determines the intersection point 241 where the power switch 103 turns off. The frequency of the ramp generator defines the switching frequency of the power switch 103. The resultant conduction intervals of the power switch 103 are shown by the voltage waveform 251 shown in the FIG. 2.

Figure 3:
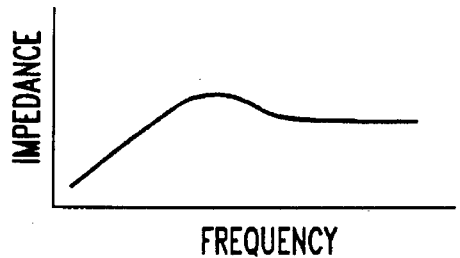
FIG. 3 discloses a graph useful for explaining the operation of the feedback loop of the circuit of FIG. 1.

By limiting the ability of the current loop to respond to low frequency current variations the low frequency output impedance of the multiloop feedback control is maintained at a desirable low value. The frequency response plot of closed loop output impedance, as shown by the graph of FIG. 3, is down at low frequencies and is substantially flat at and above the resonant frequency of the output filter.

Figure 4:
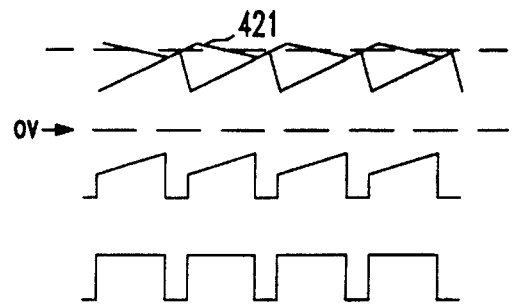
FIG. 4 discloses waveforms for describing another mode of operation of the circuit of FIG. 1.

A variation of the operation of the circuit of FIG. 1 is shown by the waveforms of FIG. 4. In this particular mode the frequency of the second pole is set at a much lower frequency than the second pole defined by the waveforms of FIG. 2. The frequency at which the second pole occurs is significantly less than and most likely one half of the switching frequency of the converter. This causes a significant modification of the waveform of the output of the differential amplifier 121. This waveform is shown by the voltage waveform 421 in FIG. 4. This arrangement is suitable for applications in which more attenuation of the high frequency signal is required. Adjustment of the frequency of the second pole of the feedback loop is attained by selection of the values of the feedback resistor 133 and feedback capacitor 132 in the feedback path of the amplifier 121.

Figure 5:
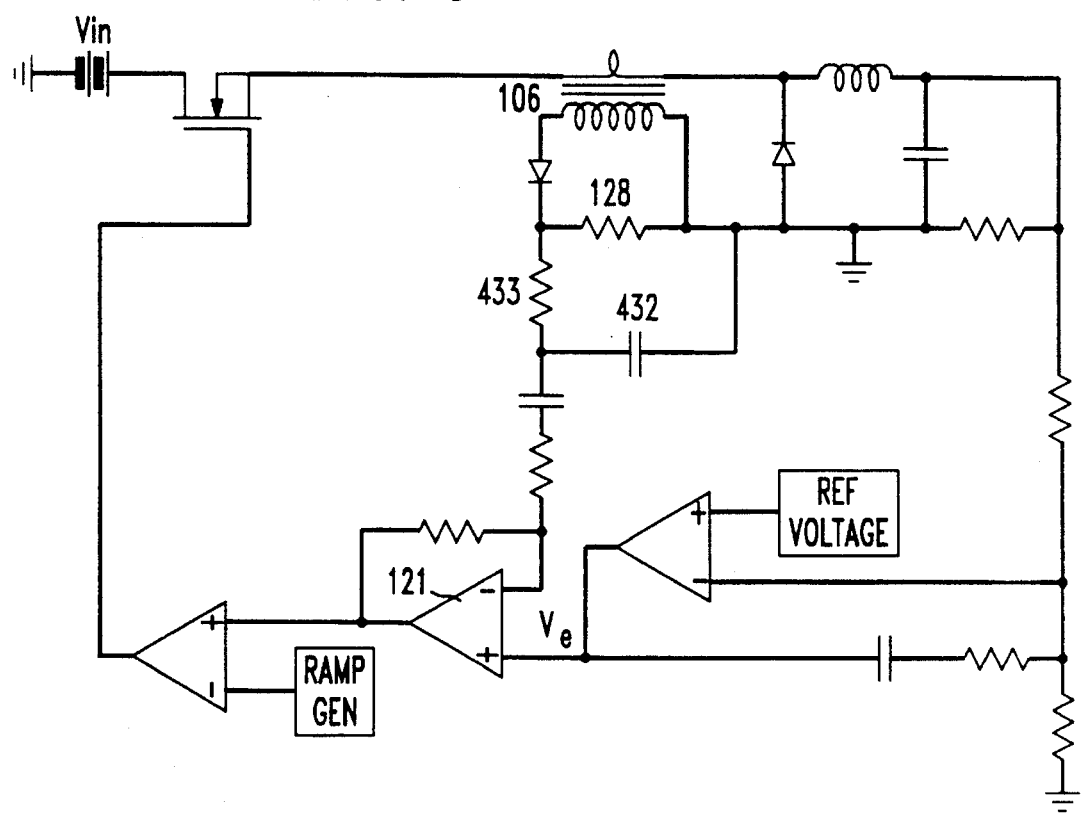
FIG. 5 is a schematic of another version of a switching mode power converter employing feedback control in accord with the principles of the invention.
Figure 6:
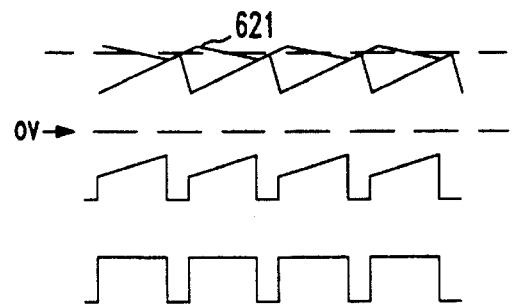
FIG. 6 discloses voltage waveforms to assist in describing the operation of the circuit of FIG. 5.

Another feedback arrangement as shown in the schematic shown in FIG. 5. The output of the current sensing transformer 106 includes a series connected resistor 433 and capacitor 432 shunting the resistor 128. This resistor 433 capacitor 432 series circuit is used to determine the second pole of the feedback arrangement in substitution for the feedback capacitor of the amplifier 121. The resulting waveforms are shown in the FIG. 6. The output of the amplifier 121 is shown by the waveform 621. This particular arrangement may be less sensitive to noise than the circuit of FIG. 1.

Figure 7:
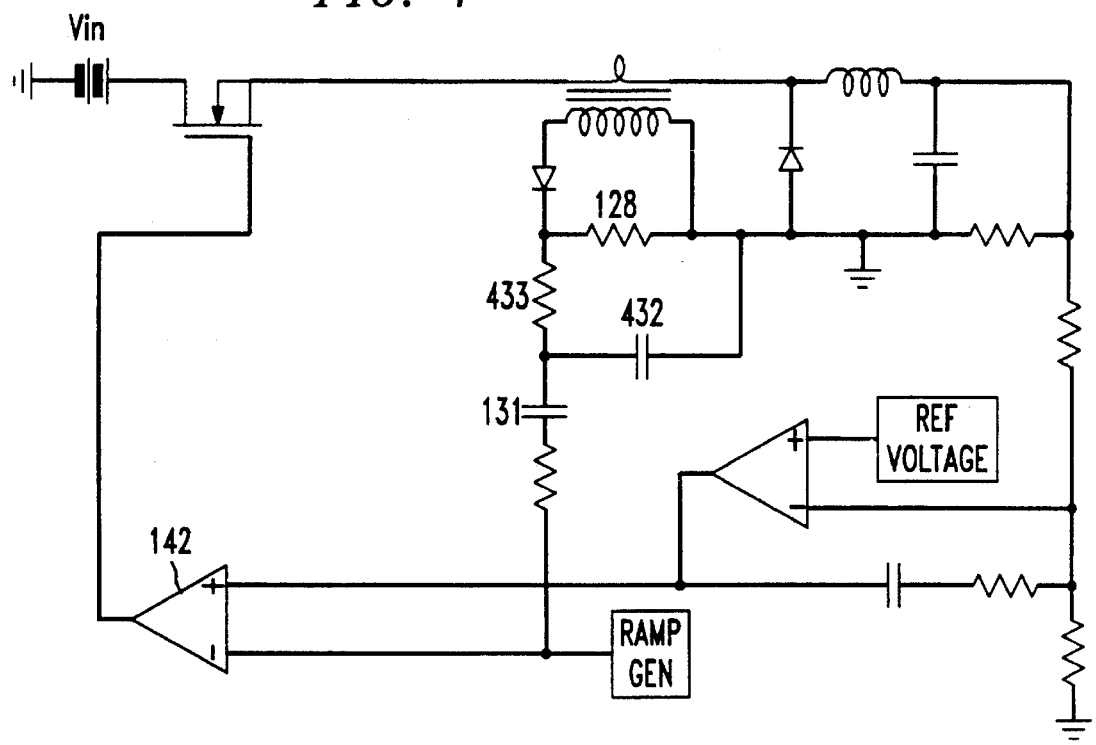
FIG. 7 is a schematic of yet another version of a switching mode power converter employing feedback control in accord with the principles of the invention.
Figure 8:
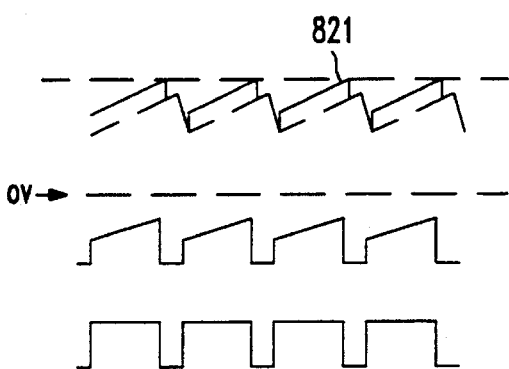
FIG. 8 discloses voltage waveforms to assist in describing the operation of the circuit of FIG. 7.

Another version of the feedback arrangement is shown in the circuit of FIG. 7. In this arrangement the voltage ramp of the sensed current is directly added to the input ramp applied to the PWM circuit 142. The values of the capacitor 432 and capacitor 131 define the frequency of the two defining poles in the feedback loop. The resulting ramp signal is shown by the voltage waveform 821 in FIG. 8.

While various variations of the feedback arrangement have been shown it is readily apparent that other variations will be suggested to others skilled in the art without departing from the spirit and scope of the invention.

We claim:

1. In a switched mode power supply, including an input, output, and a power switch for controlling current flow between the input and output and an output filter; a multiple loop feedback control for controlling the power switch of the switched mode power supply;

comprising:

voltage sensing circuitry connected to sense a voltage of the output;

current sensing circuitry connected to sense the current flow controlled by the power switch and generate a voltage therefrom;

means for generating an error voltage representative of a difference between the voltage of the voltage sensing circuitry and a reference voltage;

means for limiting a response of the multiple loop feedback control to low frequency including a frequency shaping circuit for attenuating current feedback signals below a resonant frequency of the output filter;

means responsive to the multiple loop feedback control for controlling a conduction interval of the power switch.

2. In a switched mode power supply, including an input, output, and a power switch for controlling current flow between the input and output and an output filter; a multiple loop feedback control for controlling the power switch of the switched mode power supply;

comprising:

voltage sensing circuitry connected to sense a voltage of the output;

current sensing circuitry connected to sense the current flow controlled by the power switch and generate a voltage therefrom;

a first amplifier connected to the voltage sensing circuitry for comparing a voltage of the voltage sensing circuitry with a reference voltage and generating an error voltage representative of a difference between the voltage of the voltage sensing circuitry and the reference voltage;

a second amplifier connected to the current sensing circuitry for adding a voltage generated by the current sensing circuitry to the error voltage;

characterized by:

the second amplifier including control components for limiting its response to low frequency current variations including a frequency shaping circuit for attenuating current loop signals below a resonant frequency of the output filter;

means responsive to the multiloop feedback control for controlling a conduction interval of the power switch.

3. In a switched mode power supply, as claimed in claim 2; wherein:

the frequency shaping circuit including a first capacitance reactance and resistance connected in series and the the series connection connected at an input of the second amplifier to limit the low frequency response of the second amplifier.

4. In a switched mode power supply, as claimed in claim 3; wherein:

the frequency shaping circuit including a second capacitance reactance and a second resistance connected in parallel as a feedback circuit for the second amplifier and operative for further shaping the response of the second amplifier and controlling a passband gain.

5. A switched mode power converter comprising:

an input for accepting a DC voltage source;

an output for connecting to a load to be energized;

an output filter circuit having a resonant frequency;

a power switch connected for controlling current flow between the input and the output and current flow to the output filter;

control circuitry for controlling periodic conduction of the power switch in order to provide a regulated voltage at the output, including:

an integrating error amplifier connected for comparing a reference voltage with a voltage of the output;

a current sensing device for sensing a current flow between the input and the output;

a differentiating amplifier coupled to the current sensing device through a differentiating capacitor and having feedback circuitry for shaping a frequency response to the current sensing device to attenuate signals below a resonant frequency of the output filter, and further connected to receive an error voltage output of the integrating error amplifier;

a ramp voltage generator having a frequency defining a frequency of operation of the power switch;

a PWM amplifier being connected to the output lead of the differentiating amplifier and connected to an output of the ramp generator; and an output of the PWM amplifier connected to drive conductive/nonconductive switching of the power switch.

6. A switched mode power converter, as claimed in claim 5 wherein:

the current sensing device being a current sensing transformer having a primary winding in a path of the current flow between the input and output and a secondary winding coupled to the differentiating amplifier.

7. A switched mode power converter, as claimed in claim 5 wherein:

the feedback circuitry having a resistance coupling an output of the differentiating amplifier to an input.

8. A switched mode power converter, as claimed in claim 5 wherein:

the feedback circuitry having a capacitance reactance and resistance connected in parallel, this parallel connection coupling an output of the the differentiating amplifier to an input.

9. A switched mode power converter, as claimed in claim 8 wherein:

the capacitance reactance and resistance and the differentiating capacitance selected to provide two poles in the feedback loop at or below the resonant frequency of the output filter and at or below one half the frequency of operation of the power switch.

10. A switched mode power converter comprising:

an input for accepting a DC voltage source;

an output for connecting to a load to be energized;

an output filter circuit having a resonant frequency;

a power switch connected in series with the output filter and also connecting the input to the output and controlling current flow between the input and the output;

control circuitry for controlling periodic conduction of the power switch in order to provide a regulated voltage at the output, including:

a voltage divider connected to be energized by the output voltage and provide a proportionate voltage at a node intermediate two resistors of the divider;

a reference voltage source;

an integrating error amplifier having its non-inverting input connected to the reference voltage source and its inverting input connected to the node intermediate two resistors of the divider;

a current sensing transformer including a primary winding connected to sense the current flow between the input and the output;

a differentiating amplifier having an inverting input coupled to a secondary winding of the current sensing transformer through a differentiating capacitor, and a non-inverting input connected to receive an error voltage output of the integrating error a replier and further including circuitry for shaping a frequency response so that current feedback signals are attenuated at a frequency below a resonant frequency of the output filter and including a parallel resistor and capacitor circuit connected as a feedback path between an output lead of the differentiating amplifier and its inverting input;

a ramp voltage generator having a frequency defining a frequency of operation of the power switch;

a PWM amplifier having a non-inverting input connected to the output lead of the differentiating amplifier and an inverting input connected to an output of the ramp generator; and an output of the PWM amplifier connected to drive conductive/nonconductive switching of the power switch.

11. A switched mode power converter comprising:

an input for accepting a DC voltage source;

an output for connecting to a load to be energized;

an output filter circuit having a resonant frequency;

a power switch connected in series with the output filter and also connecting the input to the output and controlling current flow between the input and the output;

control circuitry for controlling periodic conduction of the power switch in order to provide a regulated voltage at the output, including:

a voltage divider connected to be energized by the output voltage and provide a proportionate voltage at a node intermediate two resistors of the divider, a reference voltage source;

an integrating error amplifier having its inverting input connected to the reference voltage source and its non-inverting input connected to the node intermediate two resistors of the divider, a current sensing transformer including a primary winding connected to sense the current flow between the input and the output;

a differentiating amplifier having an inverting input coupled to a secondary winding of the current sensing transformer through a differentiating capacitor, and a non-inverting input connected to receive an error voltage output of the integrating error amplifier and further including a paralleled resistor and capacitor circuit connected as a feedback path between an output lead of the differentiating amplifier and its inverting input for shaping a frequency response of a current feedback signal;

a ramp voltage generator having a frequency defining a frequency of operation of the power switch;

the capacitance reactance and resistance and the differentiating capacitance selected to shape the current feedback signal by providing two poles in the feedback loop at or below the resonant frequency of the output filter and at or below one half the frequency of operation of the power switch;

a PWM amplifier having an inverting input connected to the output lead of the differentiating amplifier and a non-inverting input connected to an output of the ramp generator, and an output of the PWM amplifier connected to drive conductive/nonconductive switching of the power switch.

12. In a switched mode power supply, including an input, output, an output filter, and a power switch for controlling current flow between the input and output; a multiple loop feedback loop control for controlling the power switch of the switched mode power supply;

comprising:

voltage sensing circuitry connected to sense a voltage of the output;

current sensing circuitry connected to sense the current flow controlled by the power switch and generate a voltage therefrom and including means for limiting response to low frequency variations in the current flow by frequency shaping feedback signals to be attenuated below a resonant frequency of the output filter;

means for comparing a voltage of the voltage sensing circuitry with a reference voltage and generating an error voltage representative of a difference between the voltage of the voltage sensing circuitry and the reference voltage;

PWM control means including an input for accepting a periodic ramp voltage and means for adding a voltage generated by the current sensing circuitry to the ramp voltage;

means responsive to the multiloop feedback control for controlling a conduction interval of the power switch.

13. A switched mode power converter comprising:

an input for accepting a DC voltage source;

an output for connecting to a load to be energized;

an output filter circuit having a resonant frequency;

a power switch connected in series with the output filter and also connecting the input to the output and controlling current flow between the input and the output;

control circuitry for controlling periodic conduction of the power switch in order to provide a regulated voltage at the output, including:

a voltage divider connected to be energized by the output voltage and provide a proportionate voltage at a node intermediate two resistors of the divider;

a reference voltage source;

an integrating error amplifier having its non-inverting input connected to the reference voltage source and its inverting input connected to the node intermediate two resistors of the divider;

a current sensing transformer including a primary winding connected to sense the current flow between the input and the output;

circuitry coupled to a secondary winding of the current sensing transformer and including a resistor and capacitor series circuit for limiting an output response to low frequency current components;

a differentiating amplifier having an inverting input coupled to the circuitry including a resistor and capacitor series circuit through a differentiating capacitor, and a non-inverting input connected to receive an error voltage output of the integrating error amplifier; and further including a resistive feedback path between an output lead of the differentiating amplifier and its inverting input;

a ramp voltage generator having a frequency defining a frequency of operation of the power switch;

the resistor and capacitor series circuit and the differentiating capacitance being selected to provide two poles in the feedback loop at or below the resonant frequency of the output filter and at or below one half the frequency of operation of the power switch and further selects the feedback response of the current loop to attenuate it below a resonant frequency of the output filter circuit, a PWM amplifier having a non-inverting input connected to the output lead of the differentiating amplifier and an inverting input connected to an output of the ramp generator, and an output of the PWM amplifier connected to drive conductive/nonconductive switching of the power switch.

14. A switched mode power converter comprising:

an input for accepting a DC voltage source;

an output for connecting to a load to be energized;

an output filter circuit having a resonant frequency;

a power switch connected in series with the output filter and also connecting the input to the output and controlling current flow between the input and the output;

control circuitry for controlling periodic conduction of the power switch in order to provide a regulated voltage at the output, including:

a voltage divider connected to be energized by the output voltage and provide a proportionate voltage at a node intermediate two resistors of the divider, a reference voltage source;

an integrating error amplifier having its non-inverting input connected to the reference voltage source and its inverting input connected to the node intermediate two resistors of the divider;

a current sensing transformer including a primary winding connected to sense the current flow between the input and the output;

circuitry coupled to a secondary winding of the current sensing transformer and including a resistor and capacitor series circuit for limiting an output response to low frequency current components;

a ramp voltage generator having a frequency defining a frequency of operation of the power switch;

a PWM amplifier having an inverting input connected via a capacitor to the resistor and capacitor series circuit and being directly connected to the ramp voltage generator and a non-inverting input connected to an output of the integrating error amplifier, the resistor and capacitor series circuit and the capacitor connected to the inverting input of the PWM amplier being operative to provide two poles in the feedback loop at or below the resonant frequency of the output filter and at or below one half the frequency of operation of the power switch and further selected to shape the feedback response of the current loop to attenuate it below a resonant frequency of the output filter circuit, and an output of the PWM amplifier connected to drive conductive/nonconductive switching of the power switch.

15. A switched mode power converter, comprising:

an input and an output, and an output filter connected to the output;

a periodically switched power switch connected for controlling energy flow from the input to the output;

a multiple loop feedback control connected to respond to an output voltage and a power switch current;

the multiple feedback loop including:

a voltage feedback loop including means for generating an error voltage representative of a deviation of the output voltage from a desired regulated value;

a current feedback loop including means for generating a current sense voltage representative of the power switch current;

means for summing the error voltage and the current sense voltage; and circuitry connected to an input of the summing means for attenuating a response frequency of the current loop gain at a value below a resonant frequency of the output filter within a passband frequency range encompassing the resonant frequency range of the output filter and attenuating the current loop signal at or below one-half of the switching frequency of the power switch.

* * * * *